United States Patent [19]

Paiva et al.

[11] Patent Number: 4,922,697
[45] Date of Patent: May 8, 1990

[54] CUTTING ATTACHMENT FOR ROTARY MOWER BLADES AND USE

[76] Inventors: Anthony J. Paiva; Pamela J. Paiva, both of Rte. 3, Box 3954-RD 25, Orland, Calif. 95963

[21] Appl. No.: 393,241

[22] Filed: Aug. 14, 1989

[51] Int. Cl.$^5$ ............................................. A01D 43/02
[52] U.S. Cl. ...................................................... 56/295
[58] Field of Search .................. 56/289, 294, 295, 255

[56] References Cited

U.S. PATENT DOCUMENTS 2,720,071 10/1985 Watanabe ........................... 56/295 X
4,306,407 12/1981 Dambroth ......................... 56/295 X

FOREIGN PATENT DOCUMENTS 2011237 2/1978 United Kingdom ................. 56/295

Primary Examiner—Thuy M. Bui

[57] ABSTRACT

A new type of removable cutting attachment for a rotary mower blade of a power driving grass mower to improve the cutting ability of the said mower comprising a tubular base having members for removably attachment to a flat mower blade, a C shaped cutting plate having a straight upper edge at the top of the C and a straight edge at the bottom of the C and two substantially semi-circular side edges, the straight edge at the top of the C being fixedly attached to the side of the base, and the straight edge at the bottom of the C forming a sharp cutting edge, a portion of the interior of the cutting plate being removed to permit passaged of cut material.

7 Claims, 2 Drawing Sheets

CUTTING ATTACHMENT FOR ROTARY MOWER BLADES AND USE

BACKGROUND OF THE INVENTION

1. Field of the Invention

This invention relates to an attachment for a rotary power mower blade which improves the cutting ability of the said mower.

Specifically, the invention provides a new type of removable cutting attachment for a rotary lawn mower blade of a power driving grass mower to improve the cutting ability of the said mower. The new removable cutting attachment for the conventional flat rotary mower blade broadly comprises a short tubular base having a front and back end and at least one flat side and having means for removably joining the back end of the base to the end of a flat mower blade, a C shaped cutting plate element having a straight upper edge at the top of the C and a straight edge at the bottom of the C and two semi circular side edges, the straight edge at the top of the C being fixedly attached to the flat side of the base, and the straight edge at the bottom of the C forming a sharp cutting edge, a portion of the interior of said cutting plate element being removed to permit passage of any material being cut by the said attachment when joined to the end of the mower blade and the mower is in operation.

The invention further provides a power mower possessing a rotary blade having the above-described cutting attachment removably attached to the end of said rotary blade.

2. Prior Art

Rotary power mowers, generally driven by a gasoline-powered engine, are in widespread use for the cutting of lawn grasses to a selected uniform height. The use of such devices, however, has presented several problems for the home user. It has been found, for example, that when such mowers hit objects which may lay unnoticed in the grass, the objects are thrown out by the blade and in some cases causes considerable damage to persons or things in its path. In addition, if the object is very solid, there is a possibility of the blade and shaft of the mower being broken with additional danger and cost of repair. Further disadvantage is found in the fact that when the grass being cut is at all wet, the cut grass tends to adhere to the conventional blade and eventually causes the mower to stop. Finally, it should be noted that the conventional blades frequently need sharpening and this requires a rather extensive operation of removing the blade and taking it to be sharpened which is costly and time consuming.

Various attachments have been suggested for use on the blade of power lawn mower, but none has yet met or solved any of the above-noted problems. Such known attachments include those disclosed in U.S. Pat. Nos. 3,093,952, 4,306,407, 3,742,688, and 3,724,182.

It is an object of the invention, therefore, to provide a new type of attachment for power lawn mowers. It is a further object to provide a cutting attachment for power lawn mower blades which makes the mower much safer to utilize. It is a further object to provide an attachment for power lawn mower blades which reduces the possibility of breakage of the blade by striking large objects in the lawn. It is a further object to provide a cutting attachment for the blade of power lawn mowers which is economical and easy to replace. It is a further object to provide a cutting attachment for the blade of power mowers which is self cleaning and does not become clogged with wet grass. These and other objects will be apparent from the following detailed description thereof.

SUMMARY OF THE INVENTION

It has now been discovered that these and other objects may be accomplished by the new removable cutting attachments for power mower blades of the present invention which provide for the first time a safe and economical attachment for the blades which greatly improves the cutting ability of the blades.

The new removable cutting attachments for the conventional flat rotary mower blades of the present invention comprise in combination a short tubular base having a front and back end and at least one flat side and having means for removably joining the back end of the base to the end of a flat mower blade, a C shaped cutting plate element having a straight upper edge at the top of the C and a straight edge at the bottom of the C and two semi circular side edges, the straight edge at the top of the C being fixedly attached to the flat side of the base, and the straight edge at the bottom of the C forming a sharp cutting edge, a portion of the interior of said cutting plate element being removed to permit passage of any material being cut by the said attachment when joined to the end of the mower blade and the mower is in operation.

When the above-described new cutting attachment is joined, preferably through bolt means, to the end of the conventional mower blade and adjusted so that the open end of the C shaped blade is facing in the same direction as the cutting edge of the mower blade itself, and adjusted in height so that it is about even with the edge of the power mower blade, the mower can then be operated to obtain the desired advantages of the new attachment.

When the mower is in operation, the attachment is held in cutting position by centrifical force and effects a very clean effective cutting of the grass. The mower with the new attachment has a greatly improved safety factor as it does not throw the debre in the grass over which the mower passes as the conventional blades as the said debre may pass through the opening in the attachment blade or the attachment may pass over the top of the said debre. In addition, when striking something hard which would normally break the blade or shaft, the new attachment pivots over the support bolt without damage to the blade or mower. Furthermore, the new attachments are easily removed from the end of the mower blade by merely removing the attachment means, such as the bolt means, and quickly replacing the worn attachment with a new sharper attachment. The new attachment is particularly desirable for use when the mower is to be used to cut wet or moist grass and it prevents any accumulation of the wet cuttings on the blade as such passes through the opening in the attachment, and the mower is able to be continuously operated with the wet grass without interruption.

DESCRIPTION OF THE DRAWINGS

The various objects and features of the present invention will be more fully understood by reference to the accompanying drawing.

With reference to FIG. 1 which shows the cutting blade attachment joined to the mower blade, 11 is the mower blade, 11A the cutting edge of the mower blade, 18 the opening or hole in the mower blade where the bolt means goes to hold the blade on the power drive, 13 is the cutting blade attachment with 12 being the cylindrical case, 12A the C shaped cutting element and 12B the cutting edge of the attachment with 14 being the projection on the mower blade to which the attachment is joined.

With reference to FIG. 2 which is a perspective view showing the relation of the attachment blade cutting element to the grass to be cut, the mower blade is shown as 11, the cutting edge of the mower blade as 11, the projection on the mower blade to which the attachment is joined as 14, the bolt means to hold the cutting attachment to the mower blade as 16, the cutting attachment as 13 with the cylindrical base as 12, the cutting blade element as 12A and the cutting edge as 12B. The grass to be cut is shown as 18 and the resulting cutting as 19.

With reference to FIG. 3 which is a cut-away portion of the mower blade showing how the cutting attachment is joined to the mower blade, the mower blade is shown as 11, the attachment as 13, the cylindrical base of the attachment as 12, the C shaped cutting element as 12A, the cutting edge of the element as 12B, the projection on the mower blade to which the attachment is joined as 14, the bolt holding the attachment on the blade as 16, lock nut is shown as 17 and the nut at the end of the bolt as 15.

With reference to FIG. 4 which is an end view of the attachment as joined to the mower blade, the blade is shown as 11, the cutting attachment as 13, the projection on the blade to which the attachment is joined as 14, the bolt holding the attachment on the mower blade as 16.

With reference to FIG. 5 which is a cut-away portion of the end of the mower blade joined to the cutting attachment, the mower blade is shown as 11, the cutting attachment as 13, the projection on the blade which holds the attachment as 14, the bolt means for holding the attachment to the blade as 16 and the nut at the end of the bolt as 15.

DETAILED DESCRIPTION OF THE INVENTION

While the above-described description of the invention and the attached drawings have been made in rather specific terms, it should be understood that various changes can be made in construction and use without departing from the scope of the invention.

The cylindrical base to which the cutting blade element is attached may be of any size and composition as long as it provides the necessary features of means for holding the cutting element and means for removably joining the cutting element to the mower blade. The base is preferably a hollow metal cylinder providing means for passing a bolt means through the center. The base is preferably about 3 to 5 inches in length and a diameter of about 1.5 to 2 inches.

Figure 6:
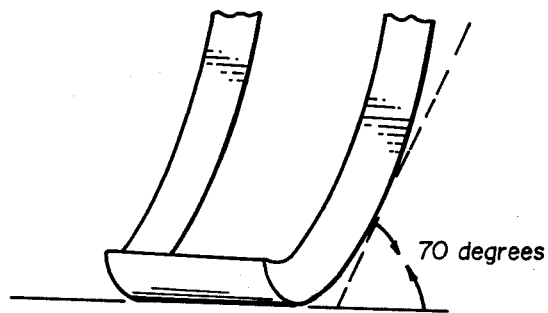
FIG. 6 is a schematic drawing of the end of the attachment showing the angle to which the plate may be directed.

The C shaped cutting element joined to the side of the cylindrical base may also be of any size and construction as long as it provide the circular shape and free cutting edge. Preferably the C shaped element is about 3 to 5 inches in width and has a diameter of about 2½ to 5 inches. The C shape plate may be semi-circular or larger, with the preferred curve being from 60 to 70% of the circumfrence of the circle. The C shaped may also be placed at an angle as shown in FIG. 6 to effect better cutting.

As noted above, a portion of the center of the C shaped cutting element is removed to permit passage of any material being cut by the attachment when joined to the end of the mower blade. The said portions generally range from about 2 by 3 inches so as leave a strong edge of at least ¼ inch on both sides to give the cutting attachment the necessary strength and support for the bottom cutting edge. The bottom cutting edge is bevelled to produce a fine cutting edge for cutting the grass.

The cutting attachment is joined to the mower blade by means of bolt means passing through the center of the base and into a projection on the side of the mower blade. The projection is preferably a metal piece welded to the top edge of the mower blade and possing an orfice where the bolt from the base can be passed and held in place by nut means.

The new cutting attachment is utilized by joining the said attachment to the projection on the top edge of the mower blade, preferably by bolt means passing through the center of the cylindrical base and then through the opening in the projection. Nut means is then attached to hold the attachment on the mower blade. When the mower is in operation, the attachment is held in cutting position by centrifical force and effects a very clean cutting of the grass. When located on the mower blade, the attachment is adjusted so that the open end of the C shaped blade is facing in the same direction as the cutting edge of the mower blade itself, and adjusted in height so that it is about even with the cutting edge of the power mower.

The new cutting attachment can be utilized with any power mower having a cutting blade to which it may be attached. In general, the mowers are power mowers powered by electrical or gasoline motors.

SPECIFIC EMBODIMENT

Figure 1:
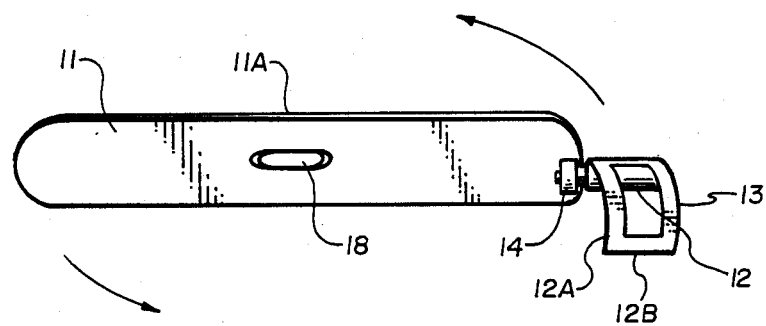
FIG. 1 is a top view of a mower blade showing the new cutting attachment joined to the end of the mower blade.
Figure 2:
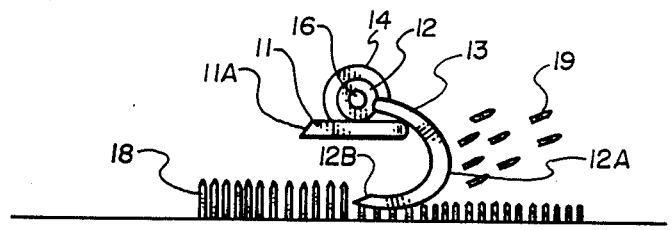
FIG. 2 is a perspective view showing the relation of the cutting blade attachment to the grass to be cut.
Figure 3:
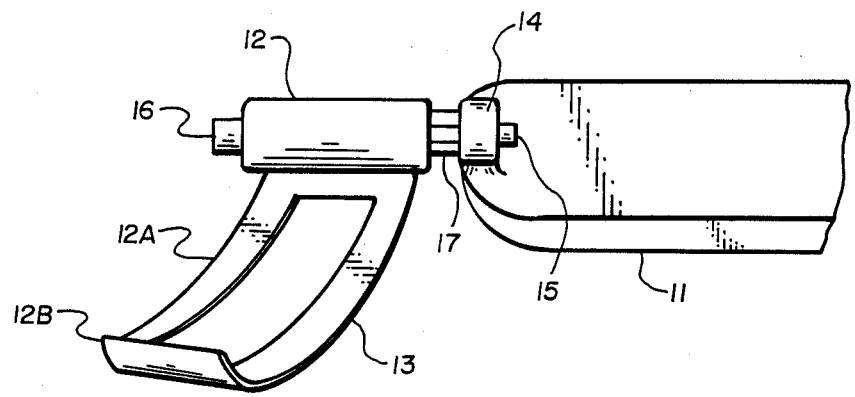
FIG. 3 is a cut-away portion of the mower blade showing how the attachment is joined to the end of the mower blade.
Figure 4:
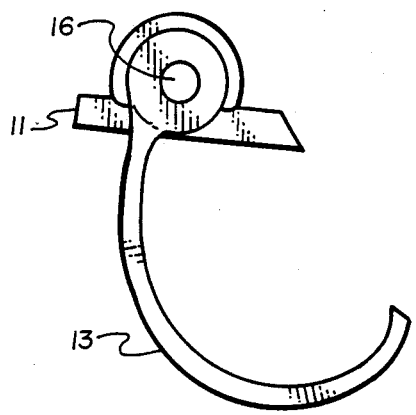
FIG. 4 is an end view of the cutting attachment showing how it is attached to the end of the mower blade in stopped position.
Figure 5:
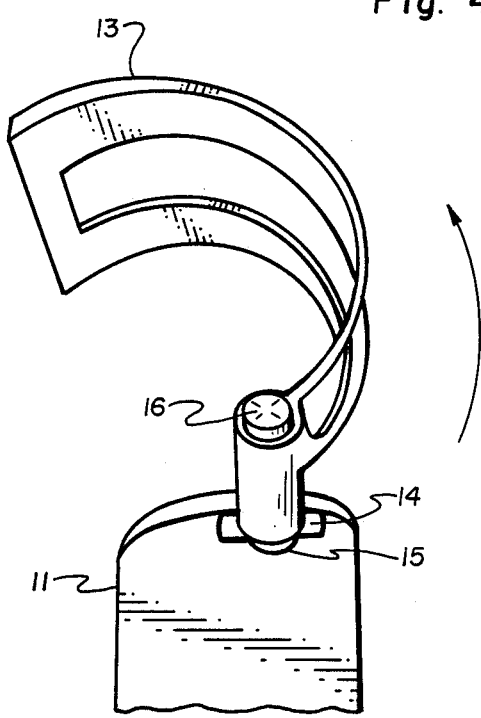
FIG. 5 is a cut-away portion of the end of the mower blade joined to the attachment showing the position of the attachment after stricking hard objects with the attachment being rotated around the support bolt.

A cutting attachment as shown in FIG. 3 was prepared from cast iron as follows: A 1½ inch section of cast iron pipe having inside diameter of ⅜ inches was cut to form the base. A cast iron sheet of about 3/16 inch thickness was cut to form a cutting place. This was formed into a C shaped plate having a diameter of about 2½ inches and the curved part making up about ⅔ of the circumference. A section was cut out of this C shaped plate to form a plate at an angle of 70 degrees as shown in FIG. 6 with the width of ¼ inches and the length of about 5¼ inches. The top edge of the C plate so formed was then soldered on to the side of the cast iron pipe base prepared as above. A section of about 1 inch by 4 inches was cut out of the centerof the C shaped plate leaving the boundary sides of the plate of about ½ inches. A ¼ inch bolt about 2½ inches long was used to join the base of the cutting attachment to the flat side of a mower cutting blade as shown in FIG. 3.

The above described cutting attachment was attached to the end of a flat conventional mower blade by use of a ⅜ inch bolt passing through the base and through a bolt receptacle projection welded on the end of the mower as shown in FIG. 3. The mower was then used to cut grass and weeds which in many places were quite wet. Even though there were several rocks or projections in the grass the cutting blade was not affected. A very close cut was obtained without any damage to the attachment.

While this invention has been described as being useful for use on simple grass rotary mower, it can also be used for larger farm mower equipment, and for use in cutting grass, hay, and other grass like products.

We claim as our invention:

1. A removable cutting attachment for a flat rotary mower blade comprising in combination a short tubular base having a front and back end and at least one flat side and having means for removably joining the back end of the base to the end of a flat mower blade, a C shaped cutting plate element having a straight upper edge at the top of the C and a straight edge at the bottom of the C and two substantially semi-circular side edges, the straight edge at the top of the C being fixedly attached to the flat side of the base, and the straight edge at the bottom of the C forming a sharp cutting edge, a portion of the interior of said cutting plate element being removed to permit passage of any material being cut by the said attachment when joined to the end of a mower blade and the mower is in operation.

2. A removable cutting attachment as in claim 1 wherein the C shaped cutting plate is bent inward at an angle of 60 to 70 degrees in relation to the base.

3. A removable cutting attachment as in claim 1 wherein the diameter of the C shaped cutting plate varies from about 2½ inches to 6 inches.

4. A removable cutting attachment as in claim 1 wherein the base is a tubular element with the attachment means for joining said base to the mower blade being bolt means.

5. A removable cutting attachment as in claim 1 wherein the C shaped cutting blade is about 2 to 3 inches in width and about 5 to 6 inches in length.

6. A flat rotary mower blade for a power mower having a cutting attachment as defined in claim 1 removably attached to the end of said blade.

7. A flat rotary mower blade as in claim 6 wherein the cutting attachment is joined to the blade by bolt means.

* * * * *